United States Patent
Muralimanohar et al.

(10) Patent No.: US 11,308,106 B1
(45) Date of Patent: Apr. 19, 2022

(54) CACHING RESULTS FOR SUB-QUERIES TO DIFFERENT DATA STORE LOCATIONS

(71) Applicant: Amazon Technologies, Inc., Seattle, WA (US)

(72) Inventors: Naveen Muralimanohar, San Jose, CA (US); Bhaven Avalani, Cupertino, CA (US); Martin Grund, Lafayette, CA (US); William Michael McCreedy, Seattle, WA (US); Ippokratis Pandis, Menlo Park, CA (US); Michalis Petropoulos, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 15/985,270

(22) Filed: May 21, 2018

(51) Int. Cl.
  *G06F 16/2458* (2019.01)
  *G06F 16/27* (2019.01)
  *G06F 16/2453* (2019.01)
  *G06F 16/2455* (2019.01)

(52) U.S. Cl.
  CPC .... *G06F 16/2471* (2019.01); *G06F 16/24539* (2019.01); *G06F 16/24552* (2019.01); *G06F 16/27* (2019.01)

(58) Field of Classification Search
  CPC ............. G06F 16/2471; G06F 16/27; G06F 16/24539; G06F 16/24552
  USPC ....................................................... 707/769
  See application file for complete search history.

(56) References Cited

U.S. PATENT DOCUMENTS

| 7,925,665 | B2 * | 4/2011 | Schneider | G06F 16/2471 707/774 |
| 2009/0177697 | A1 * | 7/2009 | Gao | G06F 16/24539 |
| 2009/0319476 | A1 * | 12/2009 | Olston | G06F 16/24539 |
| 2011/0072006 | A1 * | 3/2011 | Yu | G06F 16/2471 707/718 |
| 2018/0089306 | A1 * | 3/2018 | Pal | G06F 16/3349 |
| 2018/0307728 | A1 * | 10/2018 | Crupi | G06F 16/24553 |

OTHER PUBLICATIONS

S. Adah, et al., "Query Caching and Optimization in Distributed Mediator Systems", to appear in the Proceedings of Sigmod 1996, Conference on Management of Data, 1996, pp. 137-148.
U.S. Appl. No. 15/382,326, filed Dec. 16, 2016, Ippokratis Pandis, et al.
U.S. Appl. No. 15/382,334, filed Dec. 16, 2016, Ippokratis Pandis, et al.

* cited by examiner

*Primary Examiner* — Robert W Beausoliel, Jr.
*Assistant Examiner* — Arthur Ganger
(74) *Attorney, Agent, or Firm* — Robert C. Kowert; Kowert, Hood, Munyon, Rankin & Goetzel, P.C.

(57) ABSTRACT

Caching results of sub-queries to different locations in a data store may be performed. A database query may be received that causes different storage engines to perform sub-queries to different locations in a data store that stores data for a database. The results of the sub-queries may be stored in a cache. When another database query is received, sub-queries generated to perform the other database query that are the same as one or more of the previously performed sub-queries may obtain the results of the sub-queries from the cache instead of performing the sub-queries again.

20 Claims, 11 Drawing Sheets

CACHING RESULTS FOR SUB-QUERIES TO DIFFERENT DATA STORE LOCATIONS

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management and solution that satisfies current storage needs without blocking future data accessibility as data management and storage solutions change. Therefore, data often becomes stored or distributed across different locations, in different formats, making subsequent attempts to analyze or otherwise collectively process the distributed data collectively difficult to perform.

Figure 1:
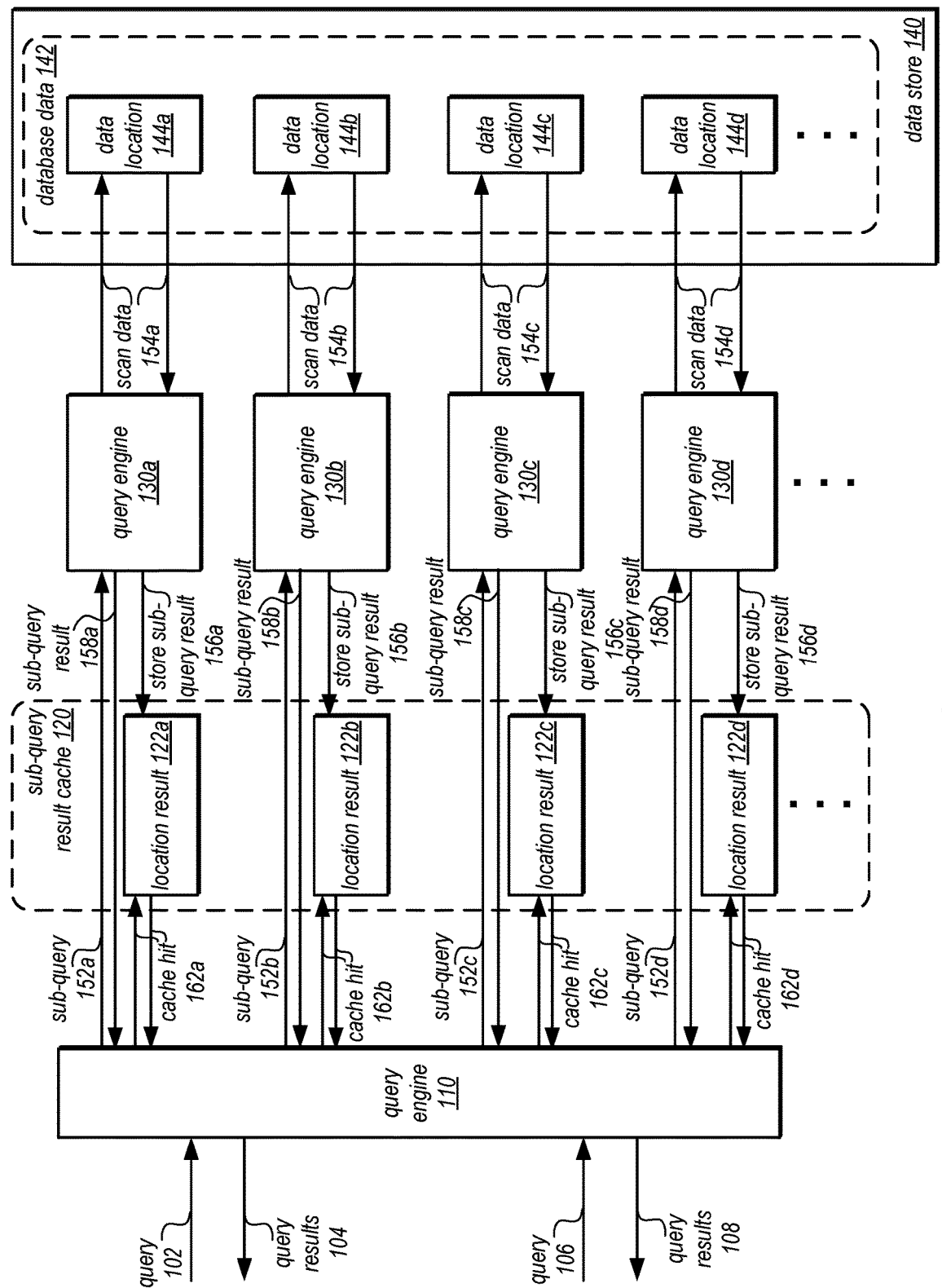
FIG. 1 illustrates a logical block diagram of caching results for sub-queries to different data store locations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of caching results for sub-queries to different data store locations are described herein. Data is generated, collected, and stored in diverse locations, in various embodiments. Federated data processing or other techniques for processing distributed data may be implemented in various embodiments, so that data processing may be distributed across different data processing or other query engines which access the different data objects in different locations. The different data processing engines or platforms used to access the different data objects may be leveraged to reduce the processing burdens or costs imposed on other data engines, such as by caching the results of remotely performed sub-queries performed in order to generate a result for received database query so that subsequent queries that would use the same sub-queries could include cached results instead of performing the sub-queries again, in some embodiments. In this way, sub-query results can be cached in order to provide a finer or more precise granularity in result caching that would allow cached results for database queries with different predicates or features that do not otherwise match to reuse those sub-query results that are the same, in some embodiments. Caching results for sub-queries to different data store locations improves performance of database queries by reducing or eliminating the performance of unnecessary sub-queries, in some scenarios. Moreover, because the sub-queries may be directed to small ranges, objects, or other locations within a data store, the cached results can be stored so that only those applicable results for a particular range, object or location may be retrieved (e.g., eliminating the need to filter, extract, or otherwise re-process some or all of the retrieved result in order to find desired cached results. For example, if the cache results perform sub-queries to different data objects in a data store that each store a log for an entire month, then a database query that is repeated every month, to retrieve data from the up to the end of the previous month may cache results from each month separately so that as the query is performed again (with a changing predicate value to include a longer range of months), the only sub-query to actually be performed would be the sub-query for the latest month that was not queried the last time the query was issued (e.g., if the query is to retrieve data from 9 months, and the query was performed the month prior then only 1 month, month 9, would have a sub-query performed to obtain results from the log for the last month as the other months results could already be cached). So in the previous example, or other examples where the queries do not match, the result caching for sub-queries may still be applicable to improve performance of subsequent queries.

FIG. 1 illustrates a logical block diagram of caching results for sub-queries to different data store locations, according to some embodiments. Query engine 110 may be implemented as part of a data processing engine, system or platform (e.g., a database processing platform, a map-reduce platform, etc.). Query engine 110 may use remote query engines, such as query engines 130a, 130b, 130c and 130d to access data that is not accessible to query engine 110 (e.g., data stored in a different location or in a different data format that is accessible by query engine 110), such as database data 142 in data store 120. Data store 140 may, in some embodiments be non-structured storage, like object-based storage, so that data may be added to data store 140 without requiring or understanding the schema or structure of the data to be stored.

Database data 142 may, in some embodiments, be data to be treated as if it were maintained as part of a database accessible to query engine 110 directly even though database data 142 may not be stored in a same format as data that is directly accessible to query engine 110. Data locations, such as data locations 144a, 144b, 144c, and 144d may be the location or representation of different objects (e.g., different data blocks, data values, data pages, files, directories or other data structures that store data within data store 140. For example, data store 140 may be a distributed data store that stores data locations as different files or objects at one or more different storage hosts. As illustrated in FIG. 1, query engine 110 may rely upon query engines 130 to access different data locations 144.

When a database query is received at query engine 110, such as query 102, query engine 110 may determine a query plan to execute the query, in some embodiments. The query plan may identify data to be obtained from sources such as data store 140 which may not be directly accessible to query engine 110. Instead, query engine 110 may include operations to perform different sub-queries to the different locations via query engines 130. For example, for different locations 144 query engine 110 may request different sub-queries at different query engines 130 (e.g., sub-query request 152a for data location 144a via query engine 130a, sub-query request 152b for data location 144b via query engine 130b, sub-query request 152c for data location 144c via query engine 130c, and sub-query request 152d for data location 144d via query engine 130d). Query engines 130 may then perform the requested sub-queries including scanning the data at the corresponding data location (e.g., query engine 130a scans data 154a in data location 144a, query engine 130b scans data 154b in data location 144b, query engine 130c scans data 154c in data location 144c, and query engine 130d scans data 154d in data location 144d) and/or applying operations (e.g., applying filtering predicates, aggregation operations, or other query operations that can be performed with respect to the individual data location 144). The sub query results, such as sub-query results 158a, 158b, 158c, and 158d, may be provided back to query engine 110.

For those sub-query results identified for caching (e.g., some, none, or all according to caching criteria, as discussed below with regard to FIG. 9), as indicated by 156a, 156b, 156c, and 156d, the sub-query result may be stored in sub-query result cache 120, such as location results 122a, 122b, 122c, and 122d. As discussed below with regard to FIGS. 6A, 7, and 8, a sub-query result cache 120 may be implemented which may store the results of the same previously performed sub-query to the same data location, in some embodiments. The location results 122 may be stored in individual files, objects, or locations so that the location result 122 for a particular sub-query may be retrieved from sub-query result cache 120 in response to a request for that same sub-query. A cache hit, such as cache hits 162a, 162b, 162c, and 162d, may allow query engine 110 to include the result for the sub-query in sub-query result cache 120 to be returned or used to return a final result instead of performing the sub-query again at engines 130a, in some embodiments. For example, query 106 received at query engine 110, may result in one or multiple of the same sub-queries (even though query 106 is different than query 102). The cached results may be used to generate query results 108 for query 106, saving time and resources to scan or otherwise process the data location again and transmit the data, in some embodiments.

Please note that the previous description of caching results for sub-queries to different data store locations is a logical illustration and thus is not to be construed as limiting as to the implementation of a query engine, sub-query result cache, data store, or other interactions to implement caching results for sub-queries to different data store locations.

This specification begins with a general description of a provider network that implements multiple different services, including data processing services and storage services, which may perform caching results for sub-queries to different data store locations. Then various examples of multiple data processors, such as a data warehouse service and a format independent data processing service, including different components/modules, or arrangements of components/module that may be employed as part of implementing the data processors are discussed. A number of different methods and techniques to implement caching results for sub-queries to different data store locations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
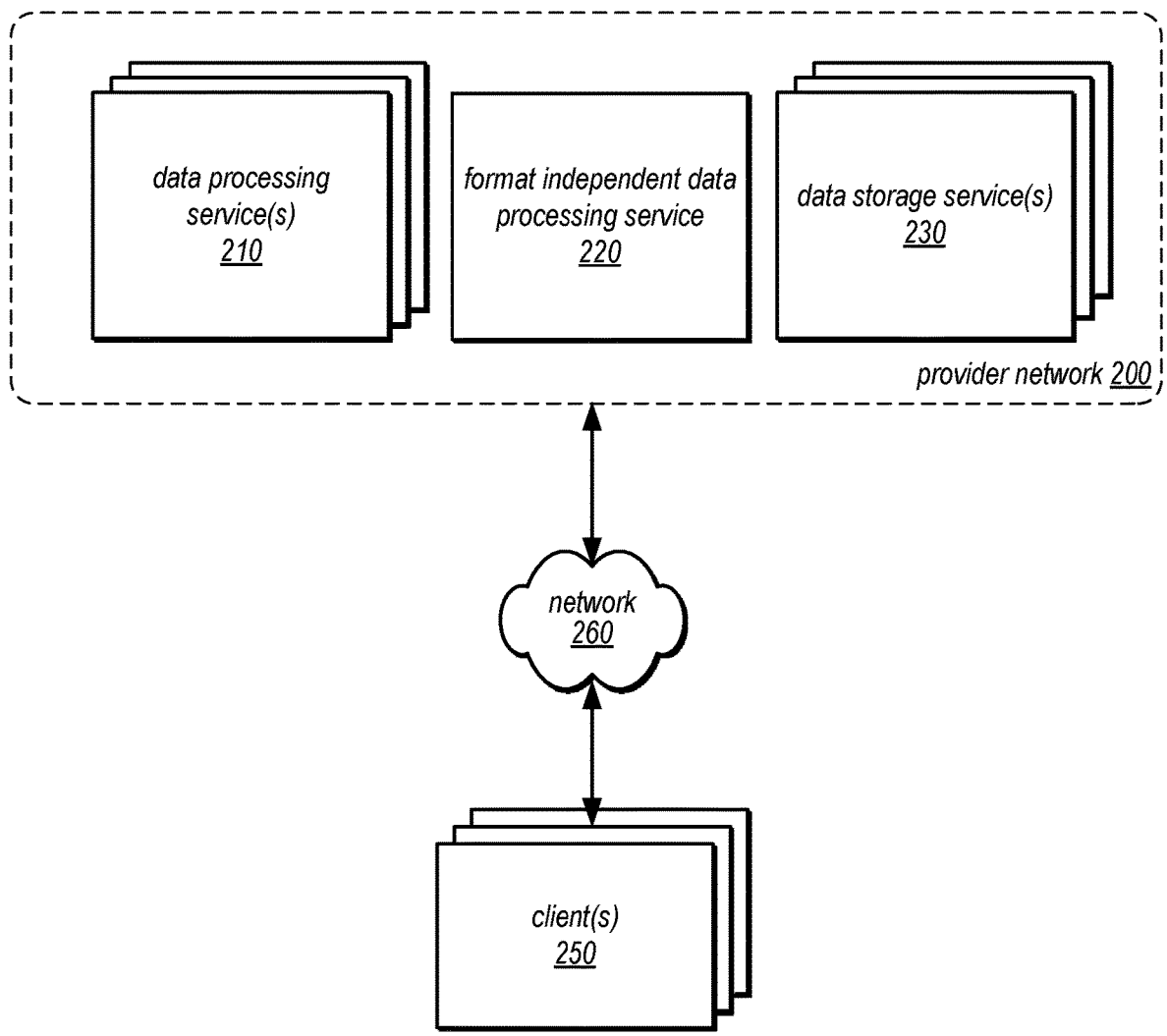
FIG. 2 is a logical block diagram illustrating a provider network offering data processing services that utilize a format independent data processing service that a logical cache results for sub-queries to different data store locations, according to some embodiments.

FIG. 2 is a logical block diagram illustrating a provider network offering data processing services that utilize a format independent data processing service that a logical cache results for sub-queries to different data store locations, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as data processing service(s) 210, (e.g., a map reduce service, a data warehouse service, and other large scale data processing services or database services), format independent data processing service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data processing service 210, format independent data processing service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as format independent data processing service 220, to execute portions of queries or other access requests with respect to data that is stored in a remote data store, such as data storage service(s) 230 (or a data store external to provider network 200) to implement distributed data processing for distributed data sets.

Figure 3:
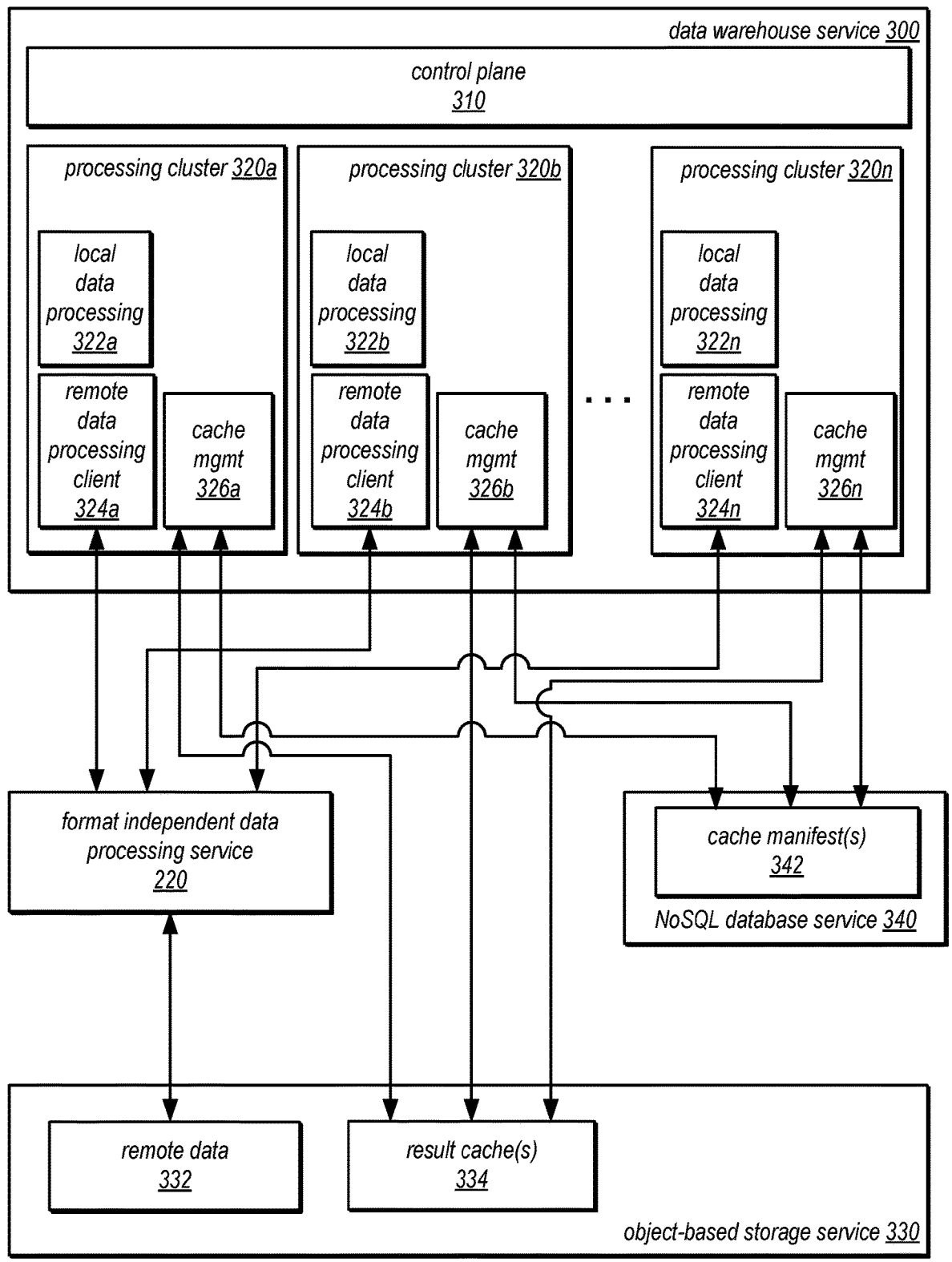
FIG. 3 is a logical block diagram of a data warehouse service that utilizes a format independent data processing service to perform sub-queries to remote data via query engines hosted in a format independent data processing service, according to some embodiments.

Format independent data processing service 220, as discussed in more detail below with regard to FIGS. 3-5, may provide a service supporting many different data or file formats for data stored in a centralized data store, like one (or more) of data storage service(s) 230. Instead of reformatting (if the format of data in remote storage is not supported by the data processing service(s) 210) and moving data from data storage service(s) 230 into the data processing service(s) 210, format independent data processing service 220 may efficiently read data from data storage service(s) 230 according to the data format in which the data is already stored in data storage service(s) 230. Format independent data processing service 220 may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230. For example, format independent data processing service 220 may execute different operations that are part of a larger query plan generated at a data processing service 210 (such as discussed above with regard to FIG. 1) and provide results to the data processing service 210 by relying upon requests from data processing service(s) 210 to determine the different operations to perform. In this way, format independent data processing service 220 may be implemented as a dynamically scalable and stateless data processing service that is fault tolerant without the need to support complex query planning and execution for multiple different data formats. Instead, format independent data processing service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces (as discussed below with regard to FIG. 5).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and format independent data processing service 220 (as discussed below with regard to FIG. 5).

Clients 250 may convey network-based services requests (e.g., access requests to read or write data may be directed to data in data storage service(s) 230, or operations, tasks, or jobs, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 230 may be implemented within provider network 200 (e.g., an application hosted on a virtual computing resource that utilizes a data processing service 210) to implement various application features or functions and thus various features of client(s) 250 discussed above may be applicable to such internal clients as well.

In at least some embodiments, one of data processing service(s) 220 may be a data warehouse service. FIG. 3 is a logical block diagram of a data warehouse service that utilizes a format independent data processing service to perform sub-queries to remote data via query engines hosted in a format independent data processing service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 1000 described below with regard to FIG. 10. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300. Control plane 310 may provide or implement access to various metrics collected for the performance of different features of data warehouse service 300, including processing cluster 320 performance and the metrics collected with respect to result cache performance for sub-queries by cache management 326, in some embodiments.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320*a*, 320*b*, through 320*n*, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data 322. Queries sent to a processing cluster 320 may be directed to local data stored in the processing cluster and/or remote data 322. Therefore, processing clusters may implement local data processing, such as local data processing 322*a*, 322*b*, and 322*c* (discussed below with regard to FIG. 5) to plan and execute the performance of queries with respect to local data in the processing cluster, as well as a remote data processing client, such as remote data processing clients 324*a*, 324*b*, and 324*c*, to direct execution of different sub-queries (e.g., operations determined as part of the query plan generated at the processing cluster 320) that are assigned to format independent data processing service 220 with respect to processing remote data 322).

Cache management, such as cache management 326*a*, 326*b*, and 326*c*, may be implemented as part of processing clusters 320, in some embodiments, to implement or facilitate the caching of results 334 of subqueries, as discussed in detail below with regard to FIGS. 6A-9. For example, a NoSQL database service 340 (which may provide a low-latency data store that stores tables of items that may not impose any schema or format on the data stored as part of an item (e.g., with the exception of a lookup or primary key) may store cache manifest(s) 342 which may indicate the location of cached results, such as result cache(s) 334 (although other locations, including at NoSQL database service 340 or locally at processing cluster 320 storage may also be used—not illustrated). As discussed below with regard to FIGS. 6A, 7, and 8 may indicate whether a cached result is still valid (e.g., has not been updated in the underlying remote data 332 to render the result incorrect).

In some embodiments, cache management 326 may perform various other cache management operations. For example, cache management 326 may collect and/or report various result cache performance metrics (which may be passed along to control plane 310 or a separate metric reporting and/or monitoring system/service in provider network 200), in some embodiments. Such cache performance metrics may include, but are not limited to, number of cache entries created for a period of time (e.g., per day), size of new cache entries created in a period of time (e.g., per hour), a hit rate of a cache, a general miss rate of a cache, a miss rate due to invalid entries, processing costs for accessing cached results, or the performance of other operations related to the cache, such as garbage collection of cached results. In some embodiments, cache management 326 may implement various security and/or durability techniques. For example, cache management may implement and/or perform encryption of cached results, control or configure access credentials to components to access cached results, implement or request security credential rotation (e.g., key rotation for key-based encryption), in some embodiments. For redundancy, in some embodiments, cache management 326 may ensure that the cache manifest and/or cached entries are stored (or backed up to) persistent storage. In some embodiments, cache management may update the cache manifest 342 and/or cached results 334 so as to ensure that false negatives or false positives are avoided (e.g., by updating the cache manifest(s) 342 before storing results—or vice versa).

In some embodiments, cache management 326 may implement garbage collection or other techniques to remove entries from cache manifest(s) 342 or cache result(s) 334. For example, cache management may request and/or configure retention policies for objects, tables, or items within NoSQL database service 340 or object-based storage service 330 to delete or remove items older than a threshold value (e.g., 30 days). In some embodiments cache management 326 may send requests to delete or remove cached result(s) 334 (and update cache manifest accordingly) if requests that would invalidate the results are received (e.g., write requests) or apply various cache retention criteria/management techniques (e.g., removing the least recently used entry every 48 hours), in some embodiments.

Cache management 326 may be implemented as part of a leader node 510 or compute nodes of a processing cluster. In some embodiments, cache management 510 may be distributed across multiple systems. For example, processing nodes of format independent data processing service 220 may implement cache management as a separate service within service 220 or on individual processing nodes to determine when, where, and what to store as part of result cache(s) 334 (or other cache storage locations).

Operations performed by control plane 310 to scale processing clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
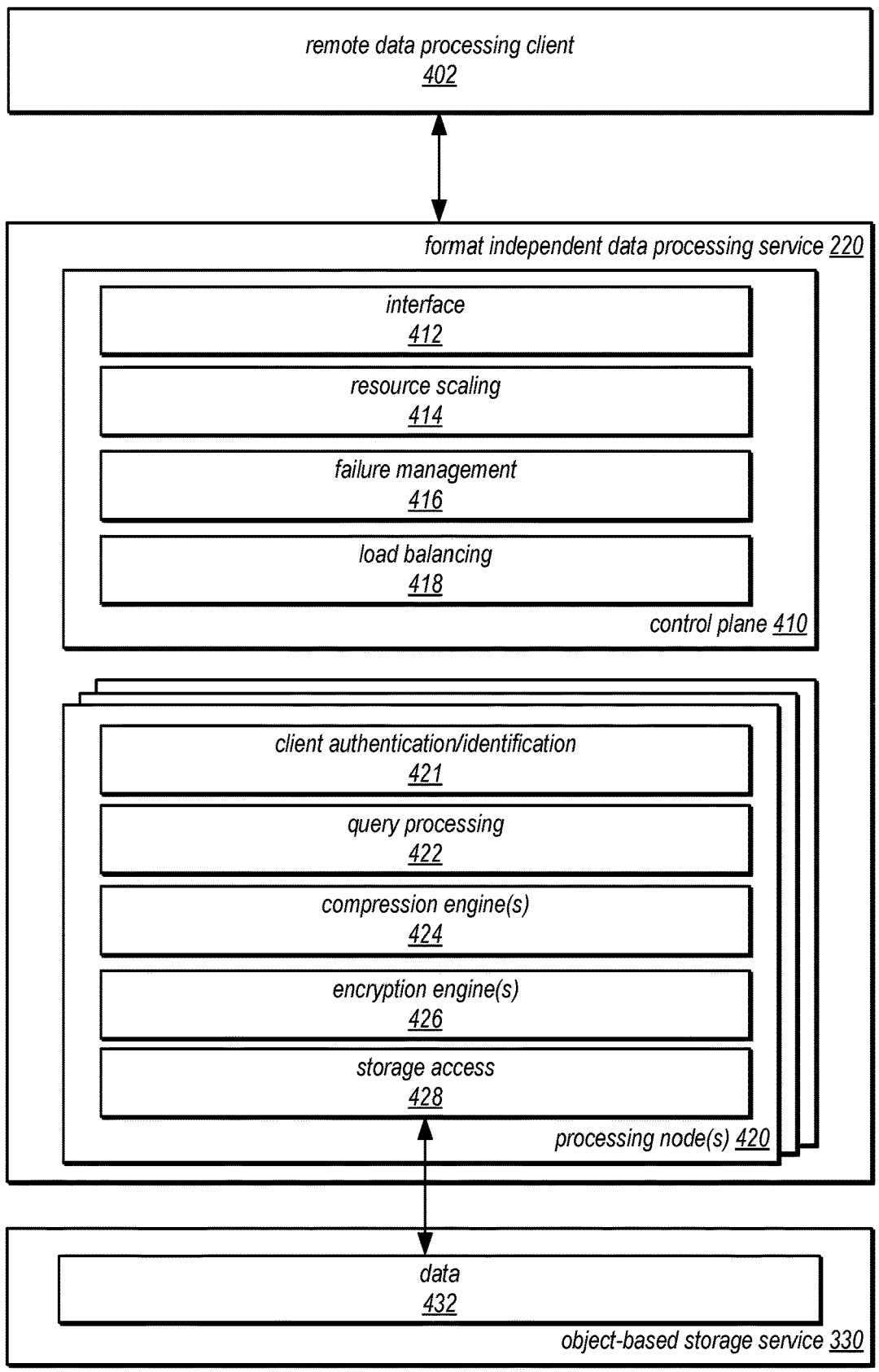
FIG. 4 is a logical block diagram illustrating a format independent data processing service, according to some embodiments.

FIG. 4 is a logical block diagram illustrating a format independent data processing service, according to some embodiments. As noted above in FIG. 2, format independent data processing service 220 may receive requests to perform processing operations with respect to data stored 432 stored in a data storage service. Processing requests may be received from a client, such as remote data processing client(s) 402 (which may another data processing service 210, like data warehouse service 300 or another data processing client, such as a database engine/cluster or map reduce cluster implemented outside of provider network 200 and communicating with format independent data processing service 220 in order to process queries with respect to data stored within provider network 200 in a data storage service 230 or to process data stored outside of provider network 200 (when the data is made accessible to format independent data processing service 220).

Format independent data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at format independent data processing service 220.

In some embodiments, format independent data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As format independent data processing service 220 may receive many remote data processing requests from multiple remote data processing client(s) 402, load balancing 418 may ensure that incoming requests are not directed to busy or overloaded processing node(s) 420.

Format independent data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Format independent data processing service 220 may also implement failure management 416 to monitor processing node(s) 420 and other components of format independent data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 10:
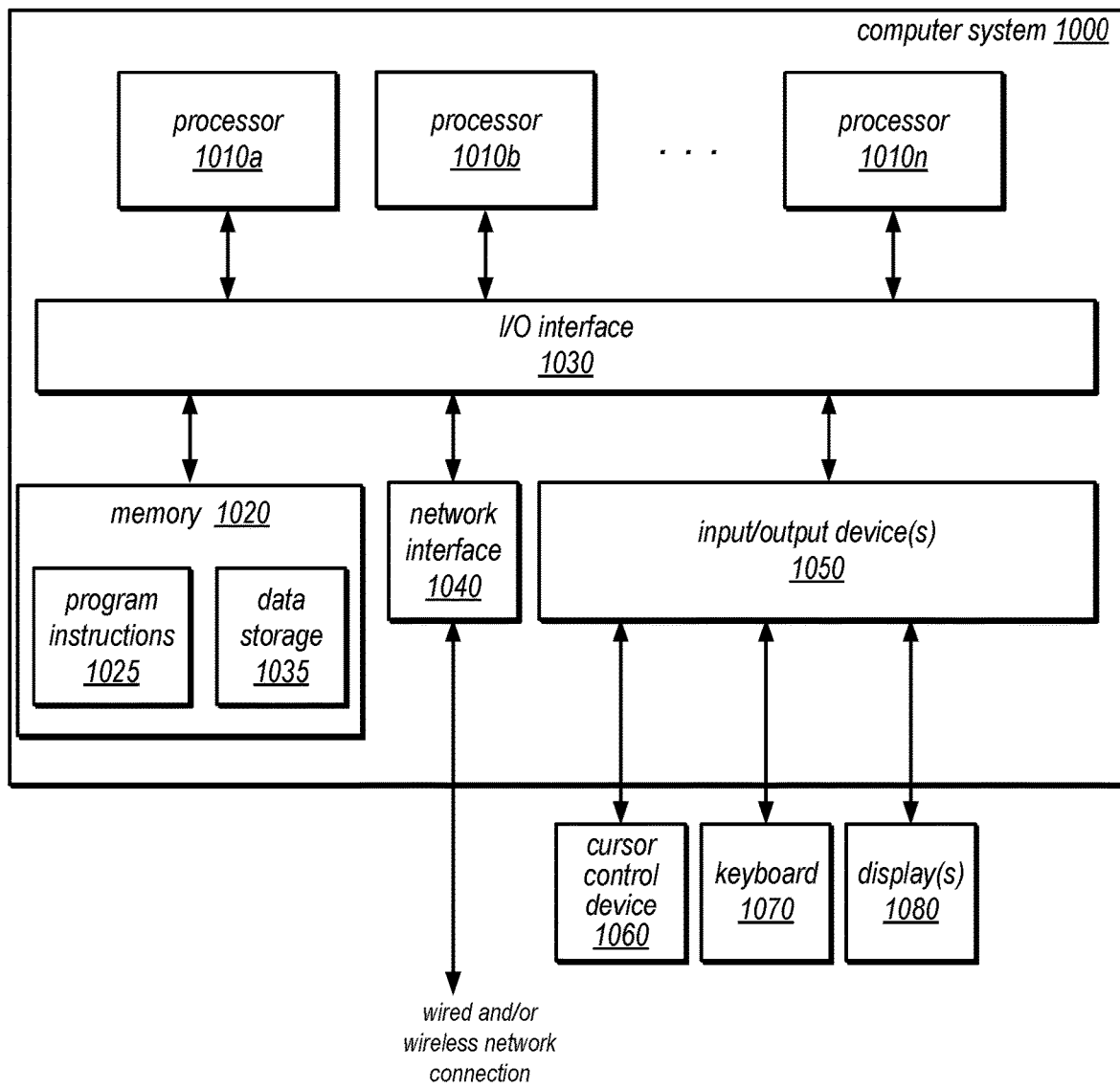
FIG. 10 illustrates an example system that implements the various methods, techniques, and systems described herein, according to some embodiments.

Processing node(s) 420 may be implemented as separate computing nodes, servers, or devices, such as computing systems 1000 in FIG. 10, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 or other features of a query engine which may perform multiple different sub-queries (e.g., processing operations) and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
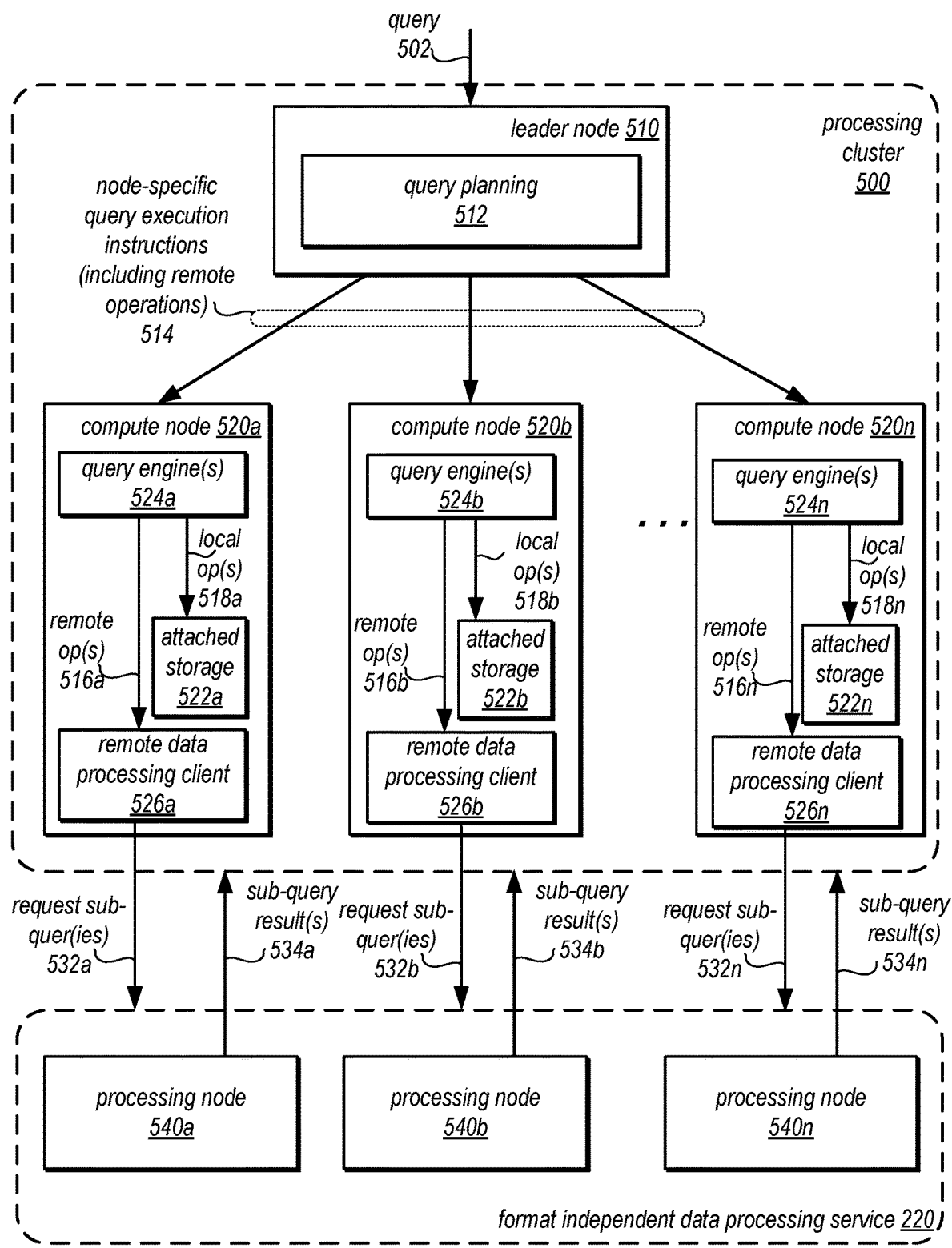
FIG. 5 is a logical block diagram illustrating an example processing cluster of a data warehouse service using a format independent data processing service to perform operations at a remote data store to perform sub-queries for a query, according to some embodiments.

FIG. 5 is a logical block diagram illustrating an example processing cluster of a data warehouse service using a format independent data processing service to perform operations at a remote data store to perform federated processing for a query, according to some embodiments. Processing cluster 500 may be data warehouse service cluster, like processing clusters 320 discussed above with regard to FIG. 3, or another processing cluster that distributes execution of a query among multiple processing nodes. As illustrated in this example, a processing cluster 500 may include a leader node 510 and compute nodes 520a, 520b, and 520n, which may communicate with each other over an interconnect (not illustrated). Leader node 510 may implement query planning 512 to generate query plan(s) and instructions 514 for executing queries on processing cluster 500 that perform data processing that can utilize remote query processing resources for remotely stored data. As described herein, each node in a processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 502 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 502 may be directed to data that is stored both locally within processing cluster 500 (e.g., at one or more of compute nodes 520) and data stored remotely (which may be accessible by format independent data processing service 220. Leader node 510 may also manage the communications among compute nodes 520 instructed to carry out database operations for data stored in the processing cluster 500. For example, node-specific query instructions 514 may be generated or compiled code that is distributed by leader node 510 to various ones of the compute nodes 520 to carry out the steps needed to perform query 502, including executing the code to generate intermediate results of query 502 at individual compute nodes may be sent back to the leader node 510. Leader node 510 may receive data and query responses or results from compute nodes 520 in order to determine a final result for query 502. A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s).

Processing cluster 500 may also include compute nodes, such as compute nodes 520a, 520b, and 520n. Compute nodes 520, may for example, be implemented on servers or other computing devices, such as those described below with regard to computer system 1000 in FIG. 10, and each may include individual query processing "slices" defined, for example, for each core of a server's multi-core processor, one or more query processing engine(s), such as query engine(s) 524a, 524b, and 524n, to execute the instructions 514 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request sub-queries, such as sub-quer(ies) 532a, 532b, and 532n to format independent data processing service 220. As noted above, in some embodiments, format independent data processing service 220 may implement a common network endpoint to which request sub-quer(ies) 532 are directed, and then may dispatch the requests to respective processing nodes, such as processing nodes 540a, 540b, and 540n. Remote data processing clients 526 may read, process, or otherwise obtain results from processing nodes, including partial results of different operations (e.g., aggregation operations) and may provide sub-query result(s), including result(s) 534a, 534b, and 534c, back to query engine(s) 524, which may further process, combine, and or include them with results of location operations 518.

Compute nodes 520 may send intermediate results from queries back to leader node 510 for final result generation (e.g., combining, aggregating, modifying, joining, etc.). Remote data processing clients 526 may retry sub-query request(s) 532 that do not return within a retry threshold. As format independent data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6A:
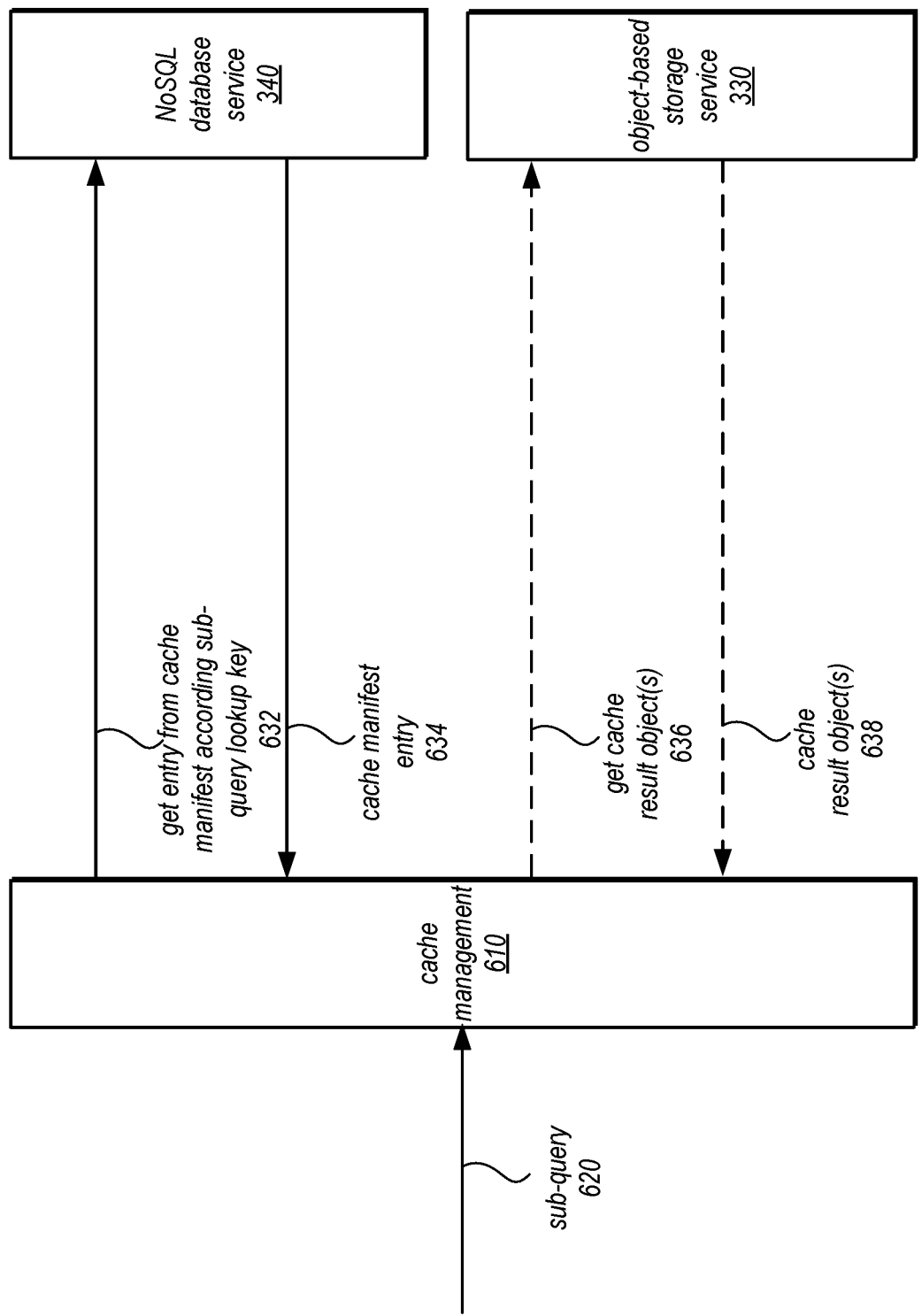
FIGS. 6A and 6B are logical block diagrams illustrating cache management operations for results of sub-queries, according to some embodiments.

Compute nodes may also leverage a result cache for previously performed sub-queries to used cached results instead of performing requests to format independent data processing service 220 to perform sub-queries on different objects in object-storage service 330. FIG. 6A is a logical block diagram illustrating cache management operations which may be implemented as part of a compute node 520 to access a cache of results of sub-queries, according to some embodiments. As indicated at 620, a sub-query for a data operation may be evaluated or indicated to cache management 610 which may perform an operation to lookup whether a valid result for the sub-query is maintained, as discussed below with regard to FIG. 8. In order to determine whether a valid result is cached, a lookup key (which may be a primary key for a corresponding item stored in a table in NoSQL database service 340 that serves as the result cache manifest) may be generated based on the sub-query (e.g., by hashing or applying another deterministic algorithm to a SQL statement that represents the sub-query, including the identified data object or location to which the sub-query is applied and/or other information, such as a version number of the underlying data object, which may be obtained from object-based storage service 330—not illustrated), in some embodiments. A request to return the entry from the cache manifest table according to the sub-query lookup key may be made 632 to NoSQL database service 340. NoSQL database service 340 may return the entry item if found, as indicated at 634, or may return an indication of item not found (not illustrated), which may indicate that a valid result is not cached for the sub-query, in some embodiments.

The cache manifest entry may, in some embodiments indicate the location of the result. For example, the entry may include an object identifier which cache management 610 may then use to send to get the identified result cache object 636 to object-based storage service 330, in one embodiment. Object-based storage service 330 may then return the cache result object 638, in one embodiment. In some embodiments, the cache manifest entry may include the cached result if the cached result is stored in NoSQL database service 340, in some embodiments. In some embodiments, other storage locations, systems, or services (not illustrated) may be identified and accessed via a request or other communication to retrieve the identified cache object (e.g., locally attached storage devices or other data storage systems).

Figure 6B:
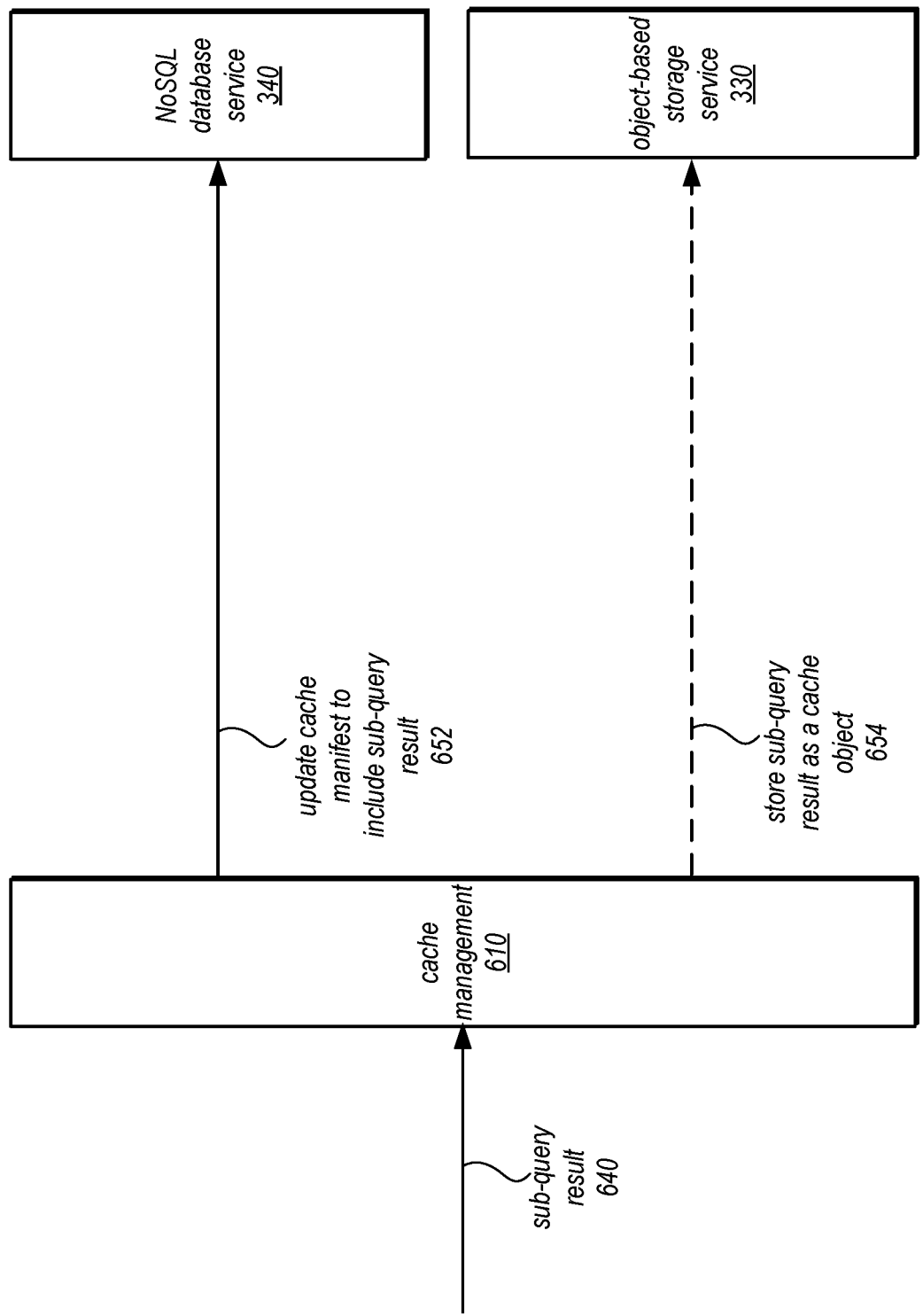

FIG. 6B is a logical block diagram illustrating cache management operations to update a cache with results of sub-queries, according to some embodiments. As indicated at 640, a result of a sub-query may be received at cache management 610. Cache management 610 may determine whether (or not) to cache the sub-query result, as discussed according to various techniques below with regard to FIG. 9. Similarly, cache management 610 may select one of many different cache storage locations or options in order to select an optimal storage location for the sub-query result (if caching is determined), in some embodiments. Cache management 610 may send a request to update a cache manifest to include the sub-query result 652 to NoSQL database service 340, in some embodiments (e.g., a request to add an item to a cache manifest table). As noted above the update may include adding an entry or item according to the same technique for performing a cache lookup (e.g., according to a same hash algorithm applied to a same set of input data). The entry in the cache manifest for the sub-query result may, in some embodiments, include an identifier and/or location of the result of the cache. In other embodiments, the result may be stored along with the manifest or in another table at NoSQL database service 340. In other examples, the sub-query result may be stored as a cache object 654 in object-based storage service 330 (e.g., according to a selection of object-based storage service 330 as the storage location for the cached result).

Figure 7:
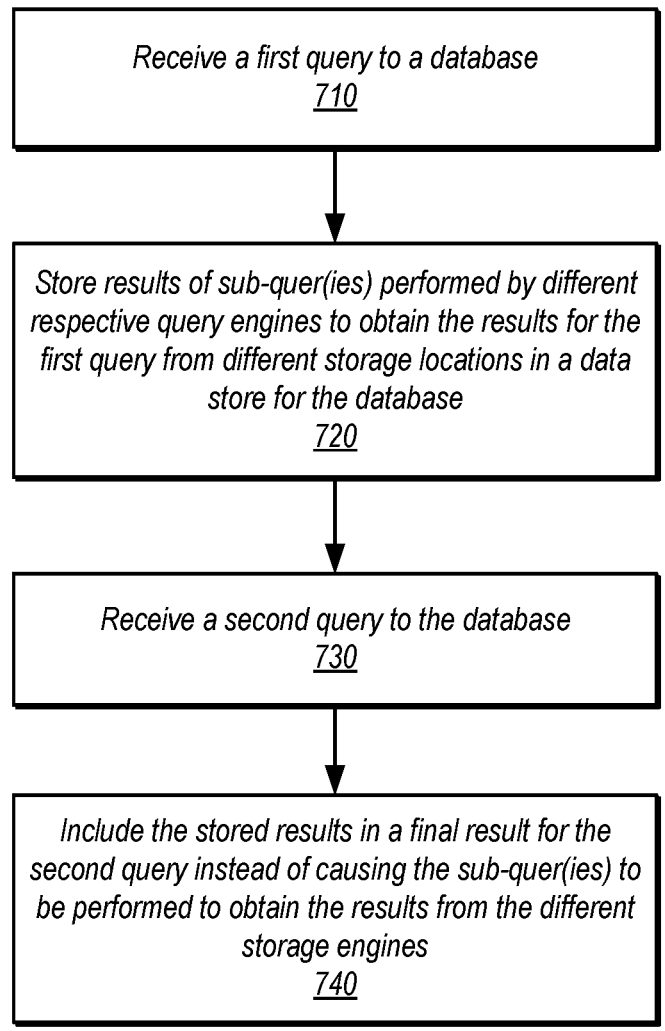
FIG. 7 is a high-level flowchart illustrating methods and techniques to implement caching results for sub-queries to different data store locations, according to some embodiments.

Although FIGS. 2-6B have been described and illustrated in the context of a provider network implementing different data processing services, like a data warehousing service, the various components illustrated and described in FIGS. 2-6B may be easily applied to other data processing systems that utilize remote query engines to query different locations in a same (or different data stores) that stored data for a database (or to be treated as part of a database for the purposes of querying, joining, and performing other database operations even if that data is not stored in a format specific to the database which receives the initial query) on behalf of clients. As such, FIGS. 2-6B are not intended to be limiting as to other embodiments of caching results for sub-queries to different data store locations. FIG. 7 is a high-level flowchart illustrating methods and techniques to implement caching results for sub-queries to different data store locations, according to some embodiments. Various different systems and devices may implement the various methods and techniques described below, either singly or working together. For example, a local or remote processing node, such as described above with regard to FIG. 4, may implement some or all of the various methods. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 710, a first query to a database may be received, in various embodiments. The first query may be a query received at a database engine, system or platform, such as a data warehouse or other data processing cluster (e.g., other types of database systems, including relational and non-relational database systems), in some embodiments. The first query may be specified in according to various formats, languages (e.g., Structured Query Language (SQL), protocols, or interfaces (e.g., query statements or predicates included in Application Programming Interface (API) message or request), in some embodiments. The query may include or identify one or more data sets, tables, files, locations, or objects that are not directly accessed by the database engine that received the first query, in some embodiments. Instead, these data sets, tables, files, locations, or objects may be accessed via other query engines for which different sub-queries to perform the first query may be directed.

As indicated at 720, results of sub-quer(ies) performed by different respective query engines to obtain the results for the first query from different storage locations in a data store for the database may be stored, in various embodiments. In various embodiments, the different query engines, such as the processing nodes of the format independent data processing service 220 or other query engines (such as query engines that format data according to format specific to the data that is stored in the data store) may send results of the sub-queries as they are determined in streaming fashion back to the database engine, system, or platform that received the first database query in order to be combined, incorporated, applied, or otherwise included in a final result for the first database query. In addition to utilizing the results from the different locations in the data store, the results can then be stored in location that caches or otherwise maintains the results for use in subsequent queries. In at least some embodiments, the results may be maintained so that the result of an individual sub-query to an individual location in the data store may be separately, accessed, evaluated, or obtained, for application in a subsequent query. In this way, the results from individual locations that may be applicable to future queries can be independently applied (e.g., so that if a result of sub-query A is applicable to a future query but the result of sub-query B is not applicable, then the stored result of sub-query A can be accessed and applied without having to read, access, or filter out or otherwise process the result of sub-query B). In some embodiments, the results can be stored along with or as part of another set of operations performed to accomplish the database query (e.g., results joined with results in a locally accessible table or data stored in another remote data store, results of operations or calculations performed upon the results, such as aggregation operations).

As indicated at 730, a second query to the database may be received, in various embodiments. Like the first query to the database, the second query may be a query received at the same database engine, system or platform, such as a data warehouse or other data processing cluster (e.g., other types of database systems, including relational and non-relational database systems) as the first query, in some embodiments. In other embodiments, the second query could be received at a different database engine, system, or platform that also provides access to the same database (e.g., receiving the second query at a read replica where the first query is received at a primary replica, or vice versa). The second query may be specified according to various formats, languages (e.g., Structured Query Language (SQL), protocols, or interfaces (e.g., query statements or predicates included in Application Programming Interface (API) message or request), in some embodiments. The second query may include or identify one or more of the same data sets, tables, files, locations, or objects that are not directly accessed by the database engine that were identified in the first query, in some embodiments.

As discussed below with regard to FIG. 8, different techniques for recognizing that sub-queries generated or identified to perform the second query may be the same as the first query. Sub-query matching (or sub-query signature matching) may be performed for example, in one embodiment. Other considerations such as whether the results are valid (e.g., have not been changed in the underlying data store) may be performed, for instance. As indicated at 740, the stored results may be included in a final result for the second query instead of causing the sub-quer(ies) to be performed to obtain the results from the different storage engines, in various embodiments. The results may, for instance, be used to perform other operations to achieve the final result for the second query (e.g., joins, comparisons, filters, data manipulations, such as summations, or other aggregations, or any other operation that may be specified in the second query). Some or all of the results may be included directly in the final result and/or may be used to generate, calculate, or otherwise derive the final result of the second query (e.g., a summation of result values could be included instead of the raw results), in some embodiments.

Figure 8:
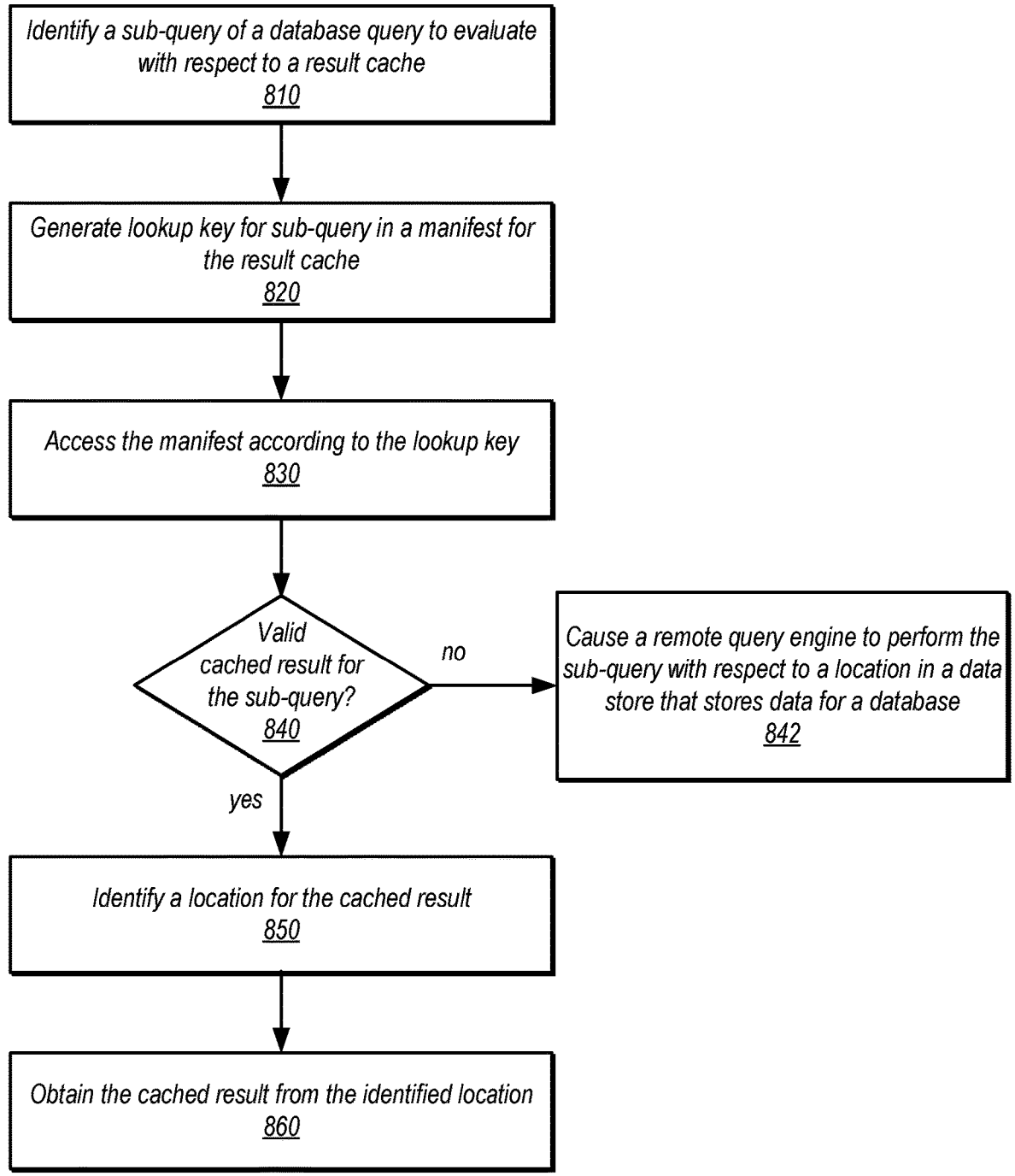
FIG. 8 is a high-level flowchart illustrating methods and techniques to check a result cache for a sub-query result that may be included in a result for a database query, according to some embodiments.
Figure 9:
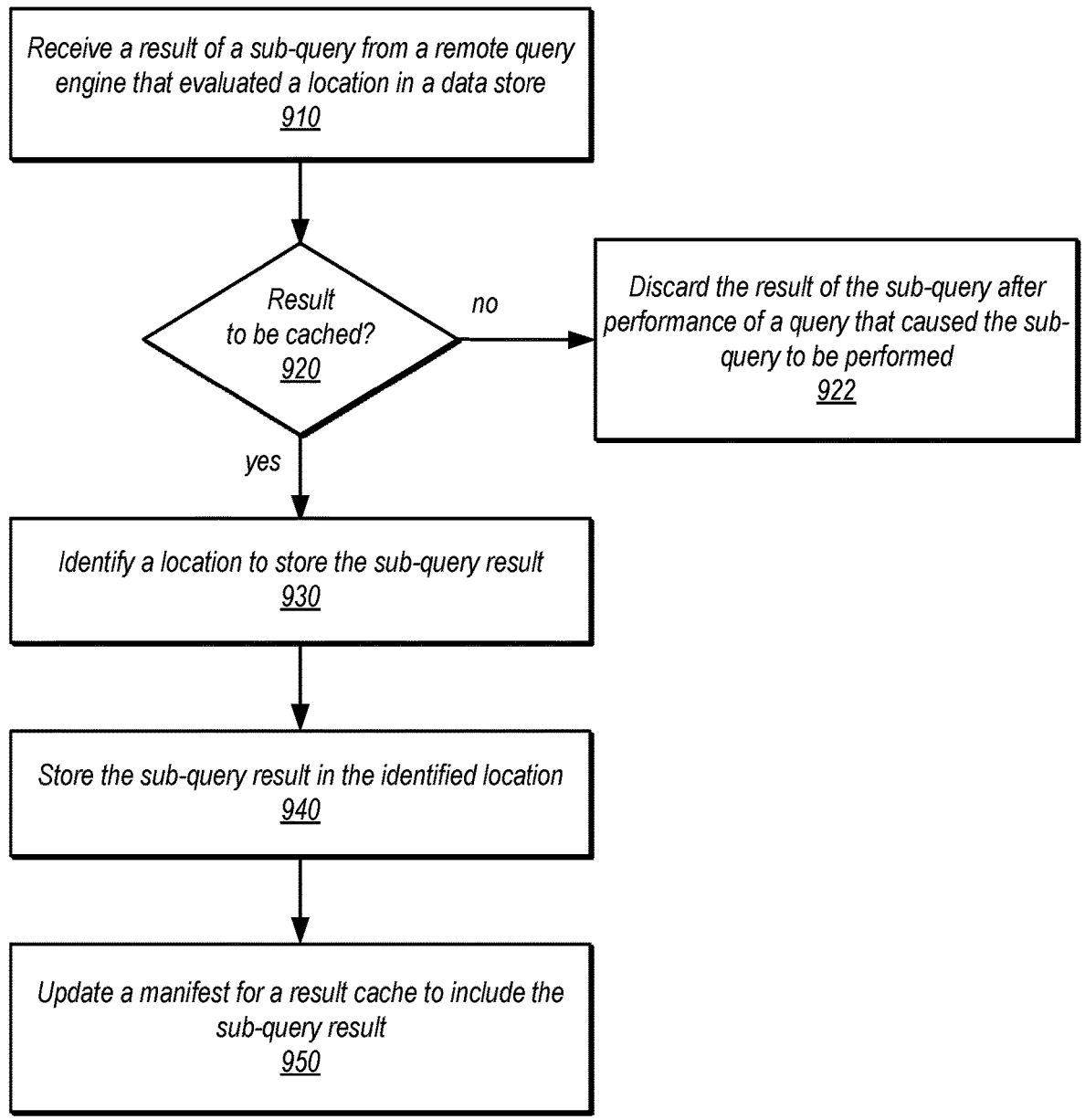
FIG. 9 is a high-level flowchart illustrating methods and techniques to update a result cache for results of sub-queries, according to some embodiments.

FIG. 8 is a high-level flowchart illustrating methods and techniques to check a result cache for a sub-query result that may be included in a result for a database query, according to some embodiments. As indicated at 810, a sub-query of a database query to evaluate with respect to a result cache may be identified, in various embodiments. Sub-queries may include various different operations performed with respect to a location in a data store (e.g., a data object, or portion thereof, such as a data block or page, group of data blocks pages, a segment of a storage device, one or more of a group of storage devices, or other logical or physical storage units within the data store). Sub-queries may be identified in order to perform a query with respect to obtaining data that is stored remote from the database engine, system, or platform that received the database query, as discussed in the examples above with regard to FIGS. 3 and 5 (e.g., such as by generating a query plan to perform the database query including those operations to obtain and/or process data from different locations in one (or more) remote data stores via remote query engines.

As indicated at 820, in various embodiments, a lookup key for the sub-query in a manifest for the result cache may be generated. For example, a result cache manifest, as discussed above with regard to FIGS. 3, 6A and 6B, may be stored in low latency data store such as NoSQL database or other non-relational data store (which may provide persistent storage) or in an in-memory result cache manifest (or other locally accessible volatile storage), in some embodiments. The lookup key can be generated in various ways to access an entry that would indicate whether a result for the sub-query is stored in the result cache. For example, in one embodiment, a fingerprint, signature, or other representation of a sub-query may be generated by applying hash function or other deterministic algorithm which can produce the fingerprint to use as a primary key lookup value in the result cache manifest. In this way, by using the deterministically generated value a check may be implemented to ensure the same sub-query would use the same result cache entry (if available), in some embodiments. In some embodiments, the fingerprint may be used in combination with other values to generate the lookup key. For example, an indicator or identifier of a version of the location in the data store from which the results were obtained may be included to generate the key so that if the underlying data in the location were changed (e.g., as may be indicated by a change in the version identifier), then the generated lookup key would not match the sub-query cache result (even though the sub-query itself may be the same). Further data or modifications (e.g., MD5 content hashing of a lookup message contents like the lookup key) may be performed in order to ensure that the generated lookup key is not corrupted or otherwise accidently modified to return a false positive hit for the sub-query in the result cache (e.g., when an error in the performance of the lookup, such as an corruption in the course of transmitting the lookup request to a storage that holds the cache manifest occurs).

As indicated at 830, the manifest for the result cache may be accessed according to the lookup key in order to determine whether a valid cache result for the sub-query exists, as indicated at 840, in some embodiments. For example, as illustrated in FIG. 6A, a lookup or get request to a NoSQL database or other data store that may store the result cache manifest may be performed which will return manifest information for that sub-query if it exists in the result cache manifest. If not, then the failure, error, or no-information-found indication may indicate that a valid cache result for the sub-query is not present. For instance, if the underlying file in the data store was changed so that the version number changed, then the lookup key though generated from the same sub-query would not match an entry in the result cache manifest as the result is no longer valid due to the change in version. In some embodiments, the lookup key may be evaluated using a comparison or other matching technique (e.g., using bitwise comparisons or other lookup techniques, such as may be implemented in content addressable memory (CAM). As indicated at 842, if no valid cached result is available for the sub-query, then a remote query engine may be caused to perform the sub-query with respect to a location in a data store that stores data for the database (e.g., in a remote storage service accessible to the remote query engine, as discussed above with regard to FIGS. 3 and 5).

As indicated at 850, a location of the cached result may be identified, in some embodiments. For example, the manifest may indicate a location of the cached result (e.g., local storage, in the same data store as the result cache manifest (which may be accessed via a separate lookup operation according to a separate location or access identifier, such as a separate key), or other data store, such as the data store that also stores the remote data). In some embodiments, the valid cache results may be present along with the cached result manifest information, and thus may be returned along with a lookup operation performed according to the generated lookup key for the sub-query. As indicated at 860, the cached result may then be obtained from the identified location, in various embodiments. A get request, an I/O operation, or other action may be taken according to the data store that stores the cached result, in some embodiments. In at least some embodiments, cached results for individual locations/sub-queries may be separate data objects, files, or portions of storage so that they may be retrieved without filtering out or extracting the data from other cached results for other sub-queries. In this way, results may be cache with greater granularity than storing all of the cached results for remote data together in single file, object, or other location.

In at least some embodiments, caching results of sub-queries may be performed according to various cost or other optimization principles in order to ensure, for example, that the results cached for sub-queries balance the competing priorities of reducing the repeat performance of sub-queries with the costs of maintaining the results of sub-queries in a result cache. FIG. 9 is a high-level flowchart illustrating methods and techniques to update a result cache for results of sub-queries, according to some embodiments. As indicated at 910, a result of a sub-query from a remote query engine that evaluated a location in a data store may be received, in some embodiments. The sub-query may be received as a single communication, as a stream of communications (e.g., over a pre-established network connection according to a data transfer protocol), or by providing a location, link, or other indication of where the data can be retrieved from (e.g., a separate file or object created to store the results), in various embodiments.

As indicated at 920, a determination may be made as to whether the result should be cached, in some embodiments. One or multiple criteria for caching decisions may be applied, in some embodiments. For example, the size of the result to be cached may be solely evaluated with respect to a threshold value (e.g., which if exceeded would not determine caching for the result), or the combination of multiple evaluations of features which may all need to be satisfied or weighed together in various combinations (e.g., the source of the data, the amount of time or other cost of performing the sub-query, the likelihood of the underlying data changing, etc.). For those results that are not determined for caching, as indicated by the negative exit from 920, the result of the sub-query may be discarded after performance of a query that caused the sub-query to be performed (e.g., after the information is used to provide a final result for the query that caused the sub-query), in some embodiments, as indicated at 922. Although not illustrated in FIG. 9, sub-queries for which the result is not to be cached may be identified in a list which may first be checked before performing a caching determination (e.g., to save costs for performing a more expensive caching analysis). In some embodiments, the list of sub-queries not to be cached could be maintained as part of the cache manifest.

As indicated at 930, if the result is to be cached, then as indicated at 940 a location to store the sub-query result may be identified, in various embodiments. In some embodiments, a result cache may exist using a single data store (e.g., single storage device, type of storage device, or storage system/service). In some embodiments, as discussed above, tiered storage solutions may be implemented. For example, a low-latency data store which may, for instance, be constrained in capacity, may be selected for small (e.g., less than a threshold amount) and/or important/frequently accessed cached results whereas one or more other cache result tiers (e.g., other types of storage device or storage systems/services) may be used for other results. As with the decision to cache the results, similar types of criteria and evaluations may performed according to result size, likelihood of access, content/data types, or other information which would allow for optimal utilization of result cache resources. Larger and/or less frequently accessed results may be stored in a cheaper/slower object data store, whereas smaller and/or more frequently accessed results may be stored in a low-latency data store, such as a NoSQL database, in some embodiments.

As indicated at 940, the sub-query result may be stored in the identified location, in some embodiments. For example, a put request, an I/O operation, or other action may be taken according to the data store that stores the cached result, in some embodiments, in order to write, copy, or otherwise place the cached result in the identified location, in some embodiments.

As indicated at 950, a manifest that describes the result cache may be updated to include the sub-query result, in various embodiments. For example, a new record, entry, item, or other information may be added to include (or replace) information that maps the location (which may include further information about the cached result) to the identified location of the result of the sub-query. Consider the lookup key feature discussed above with regard to FIG. 8, a lookup key may be generated according to a same technique in order to store the entry in the manifest that would be found/evaluated when a determination as to whether a valid cached result is maintained is performed. Other indexes, such as search trees like various types of b-tree, or other data structures for searching for manifest information may be implemented and thus the previous examples are not intended to be limiting.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of caching results for sub-queries to different data store locations as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory to store program instructions which, if performed by the at least one processor, cause the at least one processor to at least:
     responsive to a first query to a database at a first query engine:
       cause, by the first query engine, different respective query engines to perform one or more sub-queries to obtain respective results for the one or more sub-queries from different storage locations in a data store for the database;
       return, by the first query engine, a final result for the first query that includes the results;
       store, by the first query engine, the results of one or more sub-queries in the data store; and
     responsive to a second query to the database at the first query engine:
       obtain, by the first query engine, the stored results directly from the data store instead of causing the different respective query engines to perform the one or more sub-queries to the different storage locations in the data store to obtain the stored results; and
       return, by the first query engine, a final result for the second query that includes the stored results.

2. The system of claim 1, wherein the program instructions further cause the at least one processor to at least:
   further responsive to the second query to the database:
     generate, by the first query engine, respective lookup keys for the one or more sub-queries; and
     access, by the first query engine, a manifest for the stored results according to the respective lookup keys to determine that valid results are stored for the one or more sub-queries;
     identify, by the first query engine, a location for the stored results based on the manifest that indicates valid results are stored for the one or more sub-queries; and
     obtain, by the first query engine, the stored results from the identified location to include in the final result for the second query.

3. The system of claim 1, wherein the program instructions further cause the at least one processor to at least:
   before the storage of the results of the one or more sub-queries, apply, by the first query engine, one or more caching criteria to determine to store the results.

4. The system of claim 1, wherein the first query and the second query are received at a processing cluster of data warehouse service of a provider network that implements the first query engine, wherein the data store is a separate storage service in the provider network, and wherein the different respective query engines are implemented as part of a format independent data processing service in the provider network.

5. A method, comprising:
   responsive to a first query to a database received at a first query engine, storing results of one or more sub-queries performed by different respective query engines to obtain the results for the first query from different storage locations in a data store for the database; and
   responsive to a second query to the database received at the first query engine,
     obtaining, by the first query engine, the stored results directly instead of causing the different respective query engines to perform the one or more sub-queries to obtain the stored results; and
     including, by the first query engine, the stored results in a final result for the second query.

6. The method of claim 5, further comprising:
   before storing the results of the one or more sub-queries, applying, by the first query engine, one or more caching criteria to determine to store the results.

7. The method of claim 6, further comprising identifying, by the first query engine, respective locations to store the results.

8. The method of claim 5, further comprising:
   receiving a result of another sub-query from a query engine that performed the other sub-query with respect to a location in the data store; and
   applying one or more caching criteria to the result of the other sub-query to determine to discard the result of the other sub-query.

9. The method of claim 5, further comprising:
   further responsive to the second query at the first query engine:
     determining, by the first query engine, that another sub-query identified to perform the second query does not have a valid stored result; and
     causing, by the first query engine, a query engine to perform the other sub-query to obtain a result for the other sub-query from a location in the data store.

10. The method of claim 5, wherein the result for a first one of the one or more sub-queries is stored in a first data store and wherein the result for a second one of the one or more sub-queries is stored in a second data store.

11. The method of claim 5, further comprising:
    further responsive to the second query to the database at the first query engine:
      generating, by the first query engine, respective lookup keys for the one or more sub-queries;
      accessing, by the first query engine, a manifest for the stored results according to the respective lookup keys to determine that valid results are stored for the one or more sub-queries;
      identifying, by the first query engine, a location for the stored results based on the manifest that indicates valid results are stored for the one or more sub-queries; and
      obtaining, by the first query engine, the stored results from the identified location to include in the final result for the second query.

12. The method of claim 11, wherein the manifest for the stored results is stored in a first data store that is different than a second data store that stores the results of the one or more sub-queries.

13. The method of claim 5, further comprising:
    removing one or more data objects storing individual ones of the results for the different storage locations according to one or more retention criteria for storing the results.

14. A non-transitory, computer-readable storage medium, storing program instructions that when executed by one or more computing devices cause the one or more computing devices to implement:

responsive to a first query to a database received at a first query engine:
    causing, by the first query engine, different respective query engines to perform one or more sub-queries to obtain respective results for the one or more sub-queries from different storage locations in a data store for the database to include a final result returned for the first query;
    storing, by the first query engine, the results of one or more sub-queries; and
responsive to a second query to the database received at the first query engine,
    obtaining, by the first query engine, the stored results directly instead of causing the different respective query engines to perform the one or more sub-queries to obtain the stored results; and
    including, by the first query engine, the stored results in a final result for the second query.

15. The non-transitory, computer-readable storage medium of claim 14, wherein the program instructions cause the one or more computing devices to further implement:
    further responsive to the second query to the database received at the first query engine:
        generating, by the first query engine, respective lookup keys for the one or more sub-queries;
        accessing, by the first query engine, a manifest for the stored results according to the respective lookup keys to determine that valid results are stored for the one or more sub-queries;
        identifying, by the first query engine, a location for the stored results based on the manifest that indicates valid results are stored for the one or more sub-queries; and
        obtaining, by the first query engine, the stored results from the identified location to include in the final result for the second query.

16. The non-transitory, computer-readable storage medium of claim 15, wherein generating respective lookup keys for the one or more sub-queries is based, at least in part, on respective statements for the one or more sub-queries and on respective version identifiers of data stored in the different locations.

17. The non-transitory, computer-readable storage medium of claim 15, wherein at least one of the stored results is stored as part of an entry for the sub-query of the one or more sub-queries that generated the at least one stored result in the manifest.

18. The non-transitory, computer-readable storage medium of claim 14, wherein the program instructions further cause the at least one processor to further implement:
    further responsive to the second query received at the first query engine:
        determining, by the first query engine, that another sub-query identified to perform the second query does not have a valid stored result; and
        causing, by the first query engine, another query engine to perform the other sub-query to obtain a result for the other sub-query from a location in the data store.

19. The non-transitory, computer-readable storage medium of claim 14, wherein the program instructions further cause the at least one processor to further implement:
    before storing the results of the one or more sub-queries, applying one or more caching criteria to determine to store the results.

20. The non-transitory, computer-readable storage medium of claim 14, wherein the program instructions cause the one or more computing devices to further implement:
    causing a data store that stores the results of the one or more sub-queries to the different locations in the data store to retain the results for a threshold period of time after which the results are to be deleted.

* * * * *